(12) United States Patent
Tseng et al.

(10) Patent No.: US 10,139,830 B2
(45) Date of Patent: Nov. 27, 2018

(54) AUTOMATIC LANE FOLLOWING CONTROL SYSTEM AND METHOD FOR VEHICLES

(71) Applicant: AUTOMOTIVE RESEARCH & TESTING CENTER, Changhua Hsien (TW)

(72) Inventors: Po-Kai Tseng, Changhua Hsien (TW); Jin-Yan Hsu, Changhua Hsien (TW); Shih-Chieh Huang, Changhua Hsien (TW)

(73) Assignee: Automotive Research & Testing Center, Changhua Hsien (TW)

( * ) Notice: Subject to any disclaimer, the term of this patent is extended or adjusted under 35 U.S.C. 154(b) by 83 days.

(21) Appl. No.: 15/394,251

(22) Filed: Dec. 29, 2016

(65) Prior Publication Data
US 2018/0188739 A1 Jul. 5, 2018

(51) Int. Cl.
*G05D 1/02* (2006.01)
*B60W 30/12* (2006.01)
*G01S 19/42* (2010.01)

(52) U.S. Cl.
CPC .......... *G05D 1/0246* (2013.01); *B60W 30/12* (2013.01); *G01S 19/42* (2013.01); *G05D 1/0278* (2013.01); *G05D 2201/0213* (2013.01)

(58) Field of Classification Search
CPC ............... G05D 1/0246; G05D 1/0278; G05D 2201/0213; B60Q 9/008; G01S 19/42; G08G 1/162; G08G 1/167
See application file for complete search history.

(56) References Cited

U.S. PATENT DOCUMENTS 5,245,422 A * 9/1993 Borcherts ............ G05D 1/0246
348/119
5,835,028 A * 11/1998 Bender ................ G05D 1/0246
340/937

(Continued)

FOREIGN PATENT DOCUMENTS

CN 101778753 B 12/2012
CN 103183028 A 7/2013

(Continued)

OTHER PUBLICATIONS

English Abstract for CN103448723A, total of 1 page.

(Continued)

*Primary Examiner* — Nicholas Kiswanto
(74) *Attorney, Agent, or Firm* — Lynette Wylie; Apex Juris, pllc.

(57) ABSTRACT

An automatic land following control system is provided and includes an image sensor, a steering angle sensor, an inertial measurement unit, a vehicle speed sensor and a controller. The image sensor senses a vehicle lane to generate a land data. The steering angle sensor senses a steering angle to generate a steering angle data. The IMU senses an acceleration, a yaw rate and a roll angle of the vehicle to generate an acceleration data, a yaw rate data and a roll angle data. The vehicle speed sensor senses a speed of the vehicle to generate a vehicle speed data. The controller receives a digital map data, the lane data, the steering angle data, the acceleration data, the yaw rate data, the roll angle data and the vehicle speed data to calculate a compensation angle data of the wheel.

9 Claims, 6 Drawing Sheets

(56) References Cited

U.S. PATENT DOCUMENTS

| | | | | |
|---|---|---|---|---|
| 6,215,392 | B1 * | 4/2001 | Okada | B62D 1/28 |
| | | | | 340/436 |
| 6,463,369 | B2 | 10/2002 | Sadano et al. | |
| 6,542,800 | B2 | 4/2003 | Kawazoe et al. | |
| 7,236,884 | B2 * | 6/2007 | Matsumoto | B60T 8/17557 |
| | | | | 340/435 |
| 8,260,498 | B2 * | 9/2012 | Deng | B60W 10/04 |
| | | | | 180/204 |
| 9,037,348 | B2 * | 5/2015 | Gunia | B62D 6/00 |
| | | | | 701/41 |
| 9,499,197 | B2 * | 11/2016 | Tan | B62D 6/00 |
| 9,862,410 | B2 * | 1/2018 | Oyama | B62D 5/0463 |
| 2010/0114431 | A1 * | 5/2010 | Switkes | B60T 8/17557 |
| | | | | 701/41 |
| 2016/0362113 | A1 * | 12/2016 | Takaso | B60W 10/18 |
| 2017/0364082 | A1 * | 12/2017 | Taieb | G01C 21/32 |

FOREIGN PATENT DOCUMENTS

| | | |
|---|---|---|
| CN | 103448723 A | 12/2013 |
| CN | 103832435 A | 6/2014 |
| EP | 1074904 B1 | 2/2001 |

OTHER PUBLICATIONS

English Abstract for CN103183028A, total of 1 page.
English Abstract for CN103832435A, total of 1 page.
English Abstract for CN101778753B, total of 1 page.
English Abstract for EP1074904B1, total of 1 page.

* cited by examiner

AUTOMATIC LANE FOLLOWING CONTROL SYSTEM AND METHOD FOR VEHICLES

BACKGROUND OF THE INVENTION

1. Field of the Invention

The present invention relates to an automatic lane following control system and method for vehicles, and more particularly to an automatic lane following control system and method for vehicles by considering a roll angle of a vehicle and a bank angle of a vehicle lane.

2. Description of Related Art

Statistics from the Ministry of Transportation show that vehicle accidents caused by lane deviation are about 51% in all collisions. In another report from the US Interstate Highway and Transportation Association, death rate caused by the vehicle lane deviation is about 58% in all traffic accident mortality. Accordingly, the probability of collision accident resulted from vehicles deviation is very high, and the vehicle lane deviation is easy to cause the death.

Therefore, car manufacturers design a lane following control (LFC) system. A center control system of the LFC system obtains a lane geometry data relative to the vehicle via a sensing system and maintains the vehicle on a centerline of a vehicle lane by controlling a steering system so as to prevent the vehicle from deviating from the vehicle lane to avoid the occurrence of traffic accidents and reduce the driving liability for a driver.

Most of the conventional LFC systems use image sensors to detect lane lines. When the vehicle is driving on a flat road, the LFC system can successfully control a steering wheel of the vehicle and allow the vehicle to travel between two lane lines.

However, when a roll angle is generated in the vehicle or a bank angle exists in the vehicle lane, the LFC system may not control the steering wheel well. Therefore, the vehicle may not efficiently keep driving between the two lane lines.

In Chinese Patent No. CN101778753B, a method and system for keeping vehicle in a lane is disclosed and prevents the vehicle from deviating from the lane when driving through a curve road. By comparing a future trajectory of the vehicle with an expecting position of the lane, the steering of the wheel is determined. However, the patent does not consider a roll angle of the vehicle, and the operating method may not be able to keep the vehicle between lane lines.

Accordingly, with reference to FIG. 6, it is necessary to consider a situation in which a vehicle 60 with a roll angle 61 or a bank angle existing in the vehicle lane to improve the conventional LFC system. Therefore, the LFC system will not deviate too much from the land and the vehicle is kept driving between the two lane lines so as to reduce a risk of accidental injury due to fatigue or deviation from the vehicle lane.

SUMMARY OF THE INVENTION

An objective of the present invention is to provide an automatic lane following control system and the automatic lane following control system may consider a roll angle of a vehicle and a bank angle of a vehicle lane to adjust a steering angle of a wheel of the vehicle so as to keep the vehicle driving between lane lines efficiently.

In order to achieve the aforementioned objective in the present invention, the present invention provides an automatic land following control system including an image sensor, a steering angle sensor, an inertial measurement unit, a vehicle speed sensor and a controller. The image sensor senses a vehicle lane to generate a land data. The steering angle sensor senses a steering angle of a wheel of the vehicle to generate a steering angle data. The IMU senses an acceleration, a yaw rate and a roll angle of the vehicle to generate an acceleration data, a yaw rate data and a roll angle data. The vehicle speed sensor senses a speed of the vehicle to generate a vehicle speed data. The controller is respectively connected to the image sensor, the steering angle sensor, the IMU and the vehicle speed sensor and receives a digital map data, the lane data, the steering angle data, the acceleration data, the yaw rate data, the roll angle data and the vehicle speed data to calculate a compensation angle data of the wheel.

Another objective of the present invention is to develop an automatic lane following control method. And the method calculates the compensation angle data of the wheel of the vehicle. According to the roll angle data and the bank angle data, the vehicle is controlled on a centerline between the two lane lines.

In order to achieve the aforementioned objective in the present invention, the present invention provides an automatic lane following control method. The method includes steps of: generating a lane data in accordance with a vehicle lane sensed by an image sensor and outputting the lane data to a centerline compute unit; calculating a centerline data in accordance with the lane data by the centerline compute unit; calculating a predicted shifting trajectory data of the vehicle in accordance with a yaw rate data, an acceleration data, a vehicle speed data of the vehicle and a steering angle of a wheel of the vehicle; calculating lateral displacement areas of the vehicle in accordance with the predicted shifting trajectory data and the centerline data; calculating an offset area in accordance with the lateral displacement areas so as to calculate an compensation angle data of the wheel of the vehicle; adjusting the compensation angle data of the wheel of the vehicle in accordance with a bank angle of the vehicle lane, a roll angle of the vehicle and a reference table.

The advantage in the present invention is that the roll angle of the vehicle and the bank angle of the vehicle lane are further considered. Therefore, the automatic lane following control system controls and prevents the wheel from deviating too much and the vehicle is controlled to drive on the centerline between the two lane lines so as to minimize a risk of accidental injury due to fatigue or deviation from the vehicle lane.

DETAILED DESCRIPTION OF THE PREFERRED EMBODIMENT

These and other aspects of the embodiments herein will be better appreciated and understood when considered in conjunction with the following description and the accompanying drawings.

Figure 1:
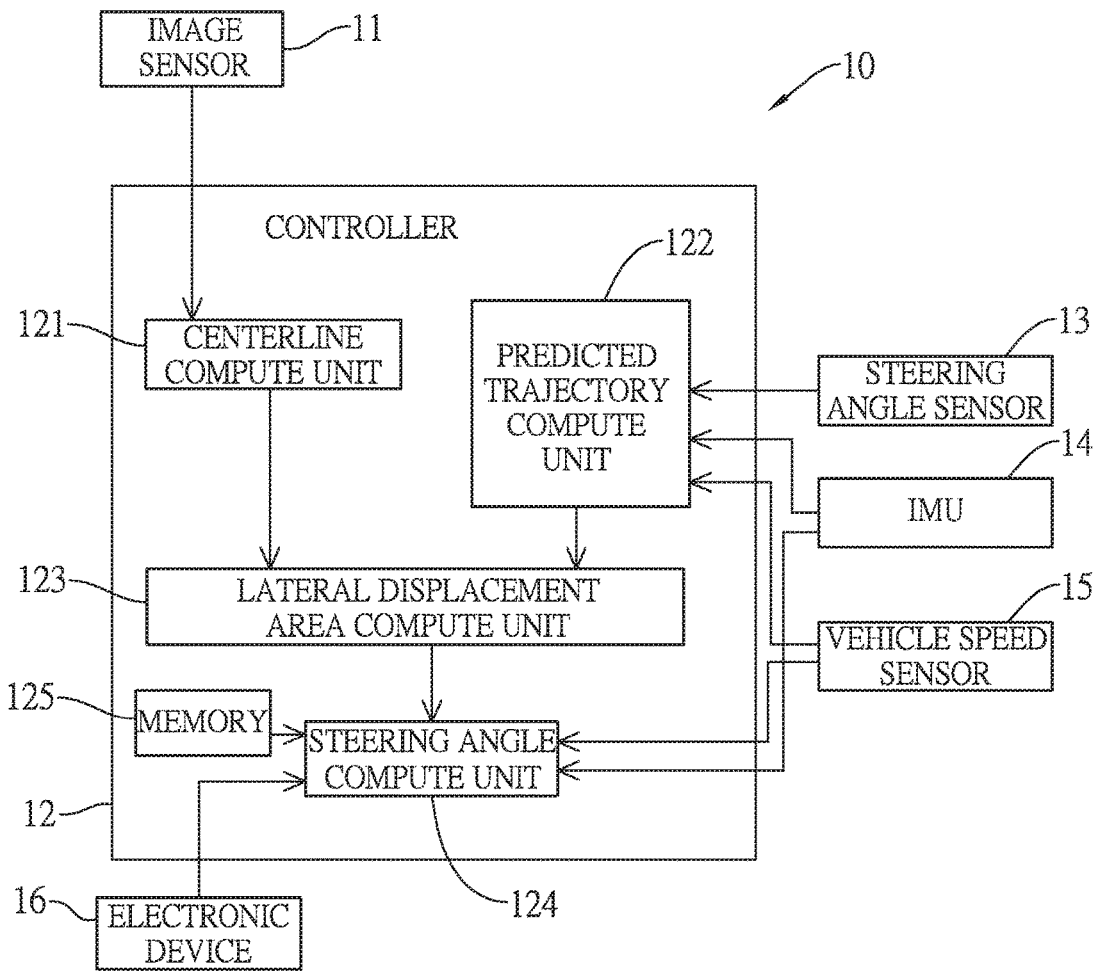
FIG. 1 is a block diagram of an automatic lane following control system in the present invention.

With reference to FIG. 1, an automatic lane following control system 10 includes an image sensor 11, a controller 12, a steering angle sensor 13, an inertial measurement unit (IMU) 14 and a vehicle speed sensor 15. The image sensor 11 is electrically connected to the controller 12. The controller 12 is electrically connected to the steering angle sensor 13, the IMU 14 and the vehicle speed sensor 15.

The controller 12 includes a centerline compute unit 121, a predicted trajectory compute unit 122, a lateral displacement area compute unit 123 and a steering angle compute unit 124.

The centerline compute unit 121 is electrically connected to the image sensor 11. The predicted trajectory compute unit 122 is electrically connected to the steering angle sensor 13, the IMU 14 and the vehicle speed sensor 15. The lateral displacement area compute unit 123 is electrically connected to the centerline compute unit 121 and the predicted trajectory compute unit 122. The steering angle compute unit 124 is electrically connected to the lateral displacement area compute unit 123 and the IMU 14.

The image sensor 11 is configured to sense two lane lines 23, 24 of a vehicle lane to generate a lane data and output the lane data to the centerline compute unit 121. The centerline compute unit 121 calculates a centerline 25 in accordance with the two lane lines 23, 24 of the vehicle lane to output a centerline data. The centerline 25 is located between the two lane lines 23, 24, and the centerline 25 is a central imagery line between the two lane lines 23, 24 where the vehicle is driving. The centerline data is outputted to the lateral displacement area compute unit 123. The automatic lane following control system 10 in the present invention determines the vehicle is shifted to left or right in accordance with the centerline data so as to adjust the deviation of the vehicle. In addition, the steering angle sensor 13 senses a steering angle of a wheel of the vehicle to generate a steering angle data and outputs the steering angle data to the predicted trajectory compute unit 122.

The IMU 14 is configured to measure a yaw rate data and an acceleration data of the vehicle. Generally, the IMU 14 includes a three-axis gyroscope and a three-direction accelerometer, and measures a yaw angle speed and an acceleration of an object in three-dimensional space so as to determine a position of the object. In the present invention, the IMU 14 is disposed within the vehicle to output the acceleration data and the yaw rate data of the vehicle to the predicted trajectory compute unit 12. Moreover, the IMU 14 outputs a roll angle data of the vehicle to the steering angle compute unit 124. The automatic lane following control system 10 in the present invention will adjust the steering angle of the wheel in accordance with the roll angle data of the vehicle.

The vehicle speed senor 15 is configured to sense the speed of the vehicle and outputs a vehicle speed data to the predicted trajectory compute unit 122. Therefore, the predicted trajectory compute unit 122 calculates lateral displacement areas in accordance with the centerline data and the predicted shifting trajectory data. Thereafter, the predicted trajectory compute unit 122 outputs the predicted shifting trajectory data to the lateral displacement area compute unit 123.

The lateral displacement area compute unit 123 calculates lateral displacement areas of the vehicle in accordance with the centerline data and the predicted shifting trajectory data and outputs the lateral displacement areas to the steering angle compute unit 124. How to calculate the lateral displacement area will be described in the following chapter.

The steering angle compute unit 124 is further electrically connected to an electronic device 16. The electronic device 16 is preferred to be a Global Positioning System (GPS). Alternatively, the electronic device 16 may be a wireless network adapter and is wirelessly connected to Internet to download the digital map data, and it is not limited herein. The electronic device 16 outputs the digital map data to the steering angle compute unit 124. By the digital map data, the steering angle compute unit 124 can acquire a bank angle data of the vehicle lane. In addition, the steering angle compute unit 124 receives a lookup table and the lookup table is stored in a memory 125 within the automatic lane following control system 10. The memory 125 may be disposed within or outside the steering angle compute unit 124, and it is not limited herein. The lookup table stores a relationship table relating to the vehicle speed data, the bank angle data of the vehicle lane/the roll angle data of the vehicle and the steering angle data of the wheel.

The steering angle compute unit 124 calculates a compensation angle data of the wheel of the vehicle in accordance with the lateral displacement areas. In addition, the steering angle compute unit 124 adjusts the steering angle of the wheel in accordance with the steering angle data of the wheel, the roll angle data/the bank angle data, the vehicle speed data and the lookup table. According to the compensation angle data, the automatic lane following control system 10 adjusts the steering angle of the wheel so as to keep the vehicle between the two lane lines. How to develop the lookup table will be described in the following chapter.

By the automatic lane following control system 10 in the present invention, the roll angle data of the vehicle and the bank angle data of the vehicle lane are considered, the error of the vehicle trajectory calculation is minimized. Therefore, the vehicle is efficiently kept driving between the two lane lines.

Figure 2:
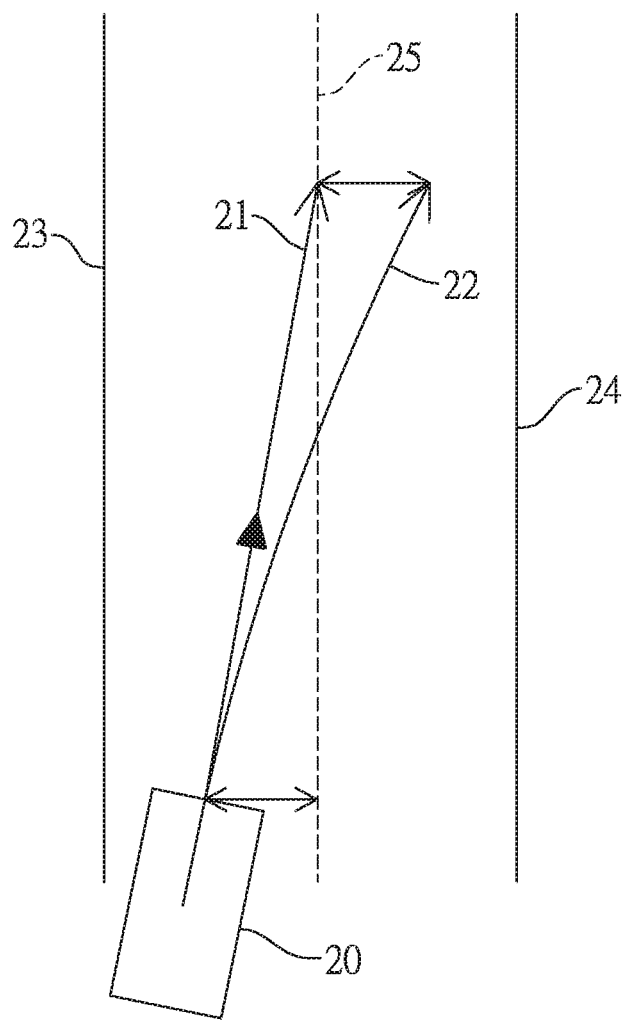
FIG. 2 is a schematic view of an observation trajectory and a predicted trajectory of the vehicle.

Practically, with reference to FIG. 2, a first trajectory 21 is a shifting lane of the vehicle 20 viewed by a driver. A second trajectory 22 is the predicted shifting trajectory of the vehicle 20 calculated by the predicted trajectory compute unit 122 in the present invention. From both of the trajectories of the vehicle 20 in FIG. 2, an error exists between the first trajectory 21 of the shifting lane for the vehicle 20 and the second trajectory 22 of the predicted shifting trajectory for the vehicle 20. Therefore, it is necessary to perform an adjustment for a driving direction of the vehicle 20 in accordance with the second trajectory 22 of the predicted shifting trajectory of the vehicle 20.

Figure 3:
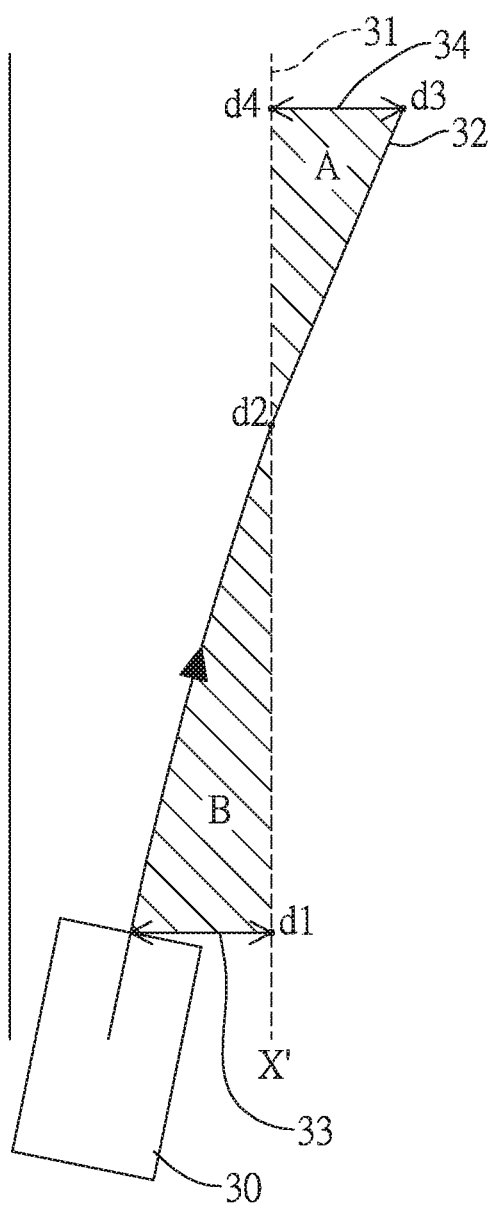
FIG. 3 is a schematic view of a lateral displacement area of the vehicle.

With reference to FIG. 3, a first trajectory 31 is the centerline of the two lane lines and a first function (func1) represents a mathematical function for the first trajectory 31. A second trajectory 32 represents the predicted shifting trajectory data of the vehicle 30 calculated in the automatic lane following control system 10 of the present invention. A second function (func2) represents a mathematical function for the second trajectory 32. A first point (d1) is an intersection point between a horizontal extension line 33 of a front head of the vehicle 30 and the first trajectory 31. The horizontal extension line 33 of the front head of the vehicle 30 is vertical to the first trajectory 31. A second point (d2) is the intersectional point between the second trajectory 32 and the first trajectory 31. A third point (d3) is a look ahead point. A distance between the third point (d3) and the front head of the vehicle 30 is a look ahead distance along the second trajectory 32. The look ahead distance is a product of multiplication of the vehicle speed (Vcar) and time (t). The time (t) is a fixed value. When the vehicle speed is faster, the look ahead distance is longer. In one of the embodiment of the present invention, the time (t) is equal to 2. A fourth point (d4) is the intersection point between a horizontal extension line 34 of the third point (d3) and the first trajectory 31. The horizontal extension line 34 of the third point (d3) is vertical to first trajectory 31.

A first area (A) is a triangle area among the second point (d2), the third point (d3) and the fourth point (d4). A second area (B) is the triangle area among the front head of the vehicle 30, the first point (d1) and the second point (d2). The functions for the first area (A) and the second area (B) are as the following:

$$A=\int_{d2}^{d4}\text{func2}(s)-\text{func1}(s)ds;$$

$$B=\int_{d1}^{d2}\text{func2}(s)-\text{func1}(s)ds.$$

The offset area is a difference value between the first area (A) and the second area (B). If the offset area is greater than zero, it is represented that the second area (B) is greater than the first area (A). The wheel of the vehicle 30 is needed to turn right. If the offset area is less than zero, it is represented that the first area (A) is greater than the second area (B). The wheel of the vehicle 30 is needed to turn left. The aforementioned functions are installed within the steering angle compute unit 124. Therefore, the steering angle compute unit 124 can determine whether the wheel is needed to turn left or right and calculate the compensation angle.

Table 1 is the lookup table among average speeds of the vehicle, the roll angles of the vehicle/the bank angles of the vehicle lane, and the steering angles of the wheel.

| Ave. Speed | Roll angle/Bank angle | Steering Angle (SWA) |
|---|---|---|
| 61.4051 | −0.5116 | −1.1091 |
| 59.7913 | −0.5193 | −1.0037 |
| 71.1411 | −0.5475 | −0.9331 |
| 69.2296 | −0.5507 | −1.0140 |
| 78.9507 | −0.5099 | −1.0153 |
| 78.1231 | −0.4946 | −1.0885 |
| 88.5421 | −0.5240 | −1.0392 |
| 87.4826 | −0.4895 | −1.0600 |
| 98.0835 | −0.5167 | −1.0937 |
| 97.7183 | −0.5137 | −0.9856 |
| 107.5555 | −0.5409 | −1.0912 |
| 106.0275 | −0.3794 | −1.0082 |
| 118.1790 | −0.6094 | −1.1796 |
| 117.0058 | −0.4480 | −0.9870 |

Figure 4:
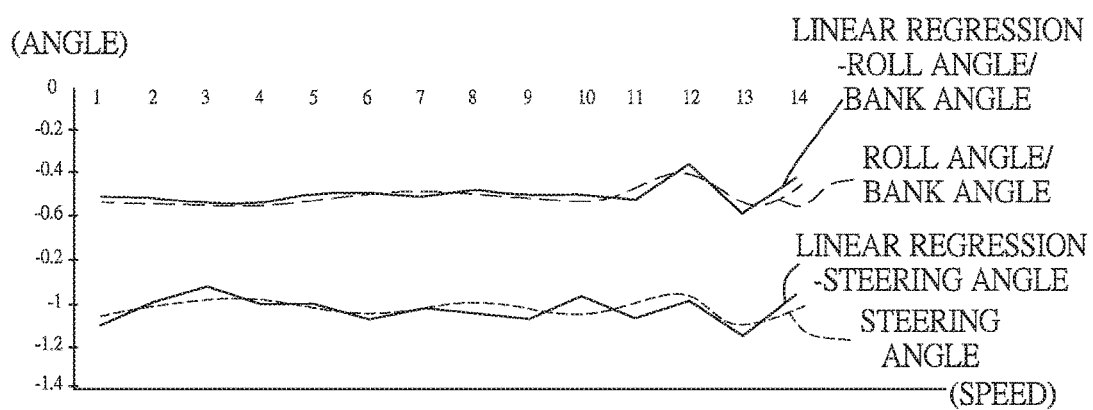
FIG. 4 is a curve view of a relationship between a roll angle of a vehicle/a bank angle of a vehicle lane and a steering angle of a wheel.

FIG. 4 is a curve view for the roll angles of the vehicle or the bank angles of the vehicle lane and the steering angles of the wheel. According to Table 1 and FIG. 4, two dotted curve lines represent the roll angles/the bank angles and the steering angles detected by the steering angle sensor 13. Two full curve lines represent the roll angles/the bank angles and the steering angles evaluated by a linear regression method. By the linear regression method, the compensation angles for the steering angles, the roll angles and/or the bank angles can be calculated. In statistics, linear regression is a kind of regression analysis and implements a minimum square function of the linear regression formula to develop a model for the relationship among one or many dependent and independent variables. Therefore, the automatic lane following control system 10 in the present invention determines the steering angle when the vehicle is driving in the certain vehicle speed in accordance with the compensation angle, the lookup table and the curve view drawn by the linear regression method. Therefore, the steering angle is adjusted and the vehicle is kept driving between the two lane lines.

Figure 5:
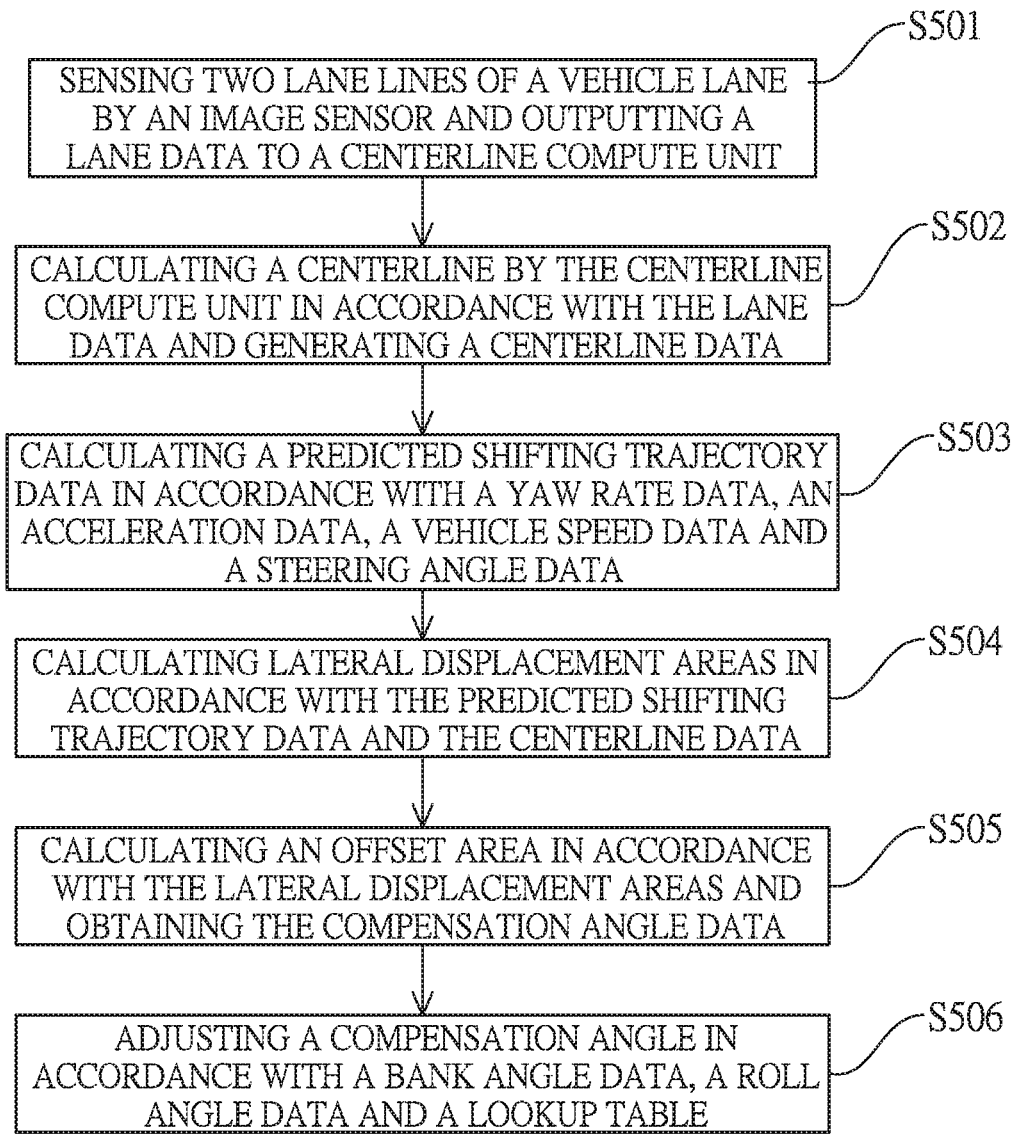
FIG. 5 is a flow chart of an automatic lane following control method in the present invention.
Figure 6:
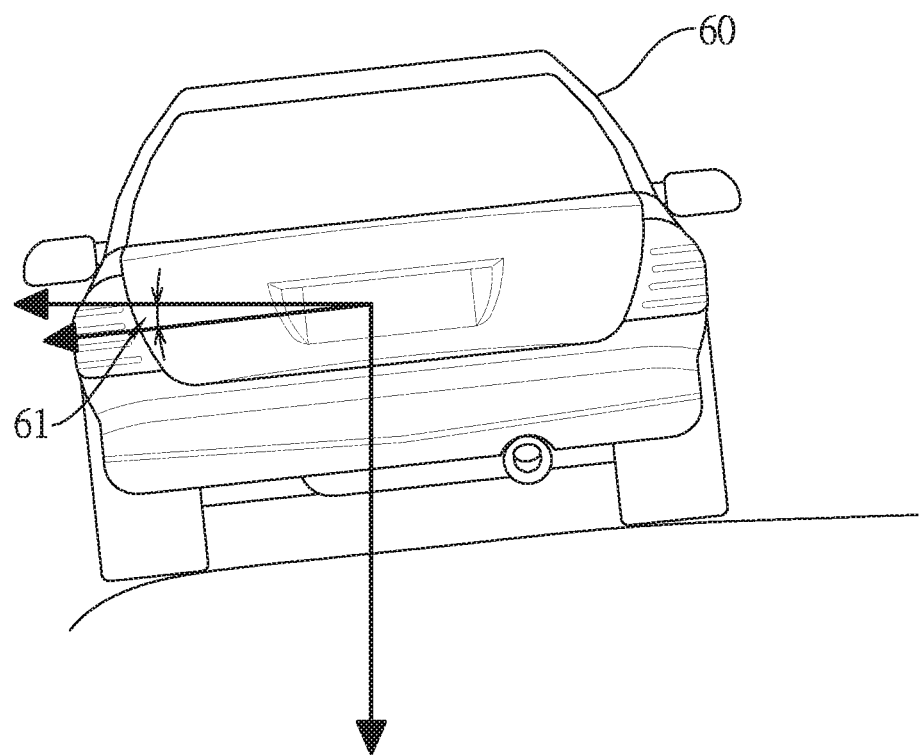
FIG. 6 is a view of the roll angle of the vehicle.

With reference to FIG. 5, an automatic lane following control method in the present invention includes following steps. In step S501, an image sensor is implemented to sense two lane lines of a vehicle lane and outputs a lane data to a centerline compute unit. In order to keep the vehicle driving between the two lane lines, it is necessary to determine the location of the two lane lines. The automatic lane following control system in the present invention determines a wheel to turn left or right in accordance with the two lane lines.

In step S502, a centerline is calculated by the centerline compute unit in accordance with the lane data and generates a centerline data. By the centerline, the vehicle deviated to left or right is determined. According to the centerline, a lateral displacement area of the vehicle is calculated so as to understand that the wheel is required to turn left or right.

In step S503, a yaw rate data, an acceleration data, a vehicle speed data of the vehicle and a steering angle data of the wheel of the vehicle are obtained to calculate a predicted shifting trajectory data of the vehicle. The yaw rate data and the acceleration data of the vehicle can be obtained by an inertial measurement unit (IMU). The vehicle speed data of the vehicle is obtained by a vehicle speed sensor. The steering angle data of the wheel is obtained by a steering angle sensor. Therefore, the predicted shifting trajectory data of the vehicle can be calculated.

In step S504, lateral displacement areas of the vehicle is calculated by a lateral displacement area compute unit in accordance with the predicted shifting trajectory data and the centerline data of the vehicle. According to the lateral displacement areas, the vehicle deviated to left or right is determined. Therefore, a compensation angle data for the wheel of the vehicle is further calculated.

In Step S505, an offset area is calculated in accordance with the lateral displacement areas and the compensation angle data of the wheel is further obtained. The lateral shifting areas (a first area and a second area) at two sides of the centerline of the vehicle is calculated. The offset area is equal to a difference between the first area and the second area. If the offset area is greater than zero, the wheel is controlled to turn right. Alternatively, if the offset area is less than zero, the wheel is controlled to turn left. The functions for the lateral shifting areas are showed in the previous chapter, and the detail description thereof is omitted herein.

In Step S506, according to the compensation angle data calculated in step S505, the compensation angle of the wheel is further adjusted in accordance with a bank angle data of the vehicle lane from a digital map data, a roll angle data of the vehicle and a lookup table. The compensation angle data calculated in step S505 is the compensation angle when the bank angle of the vehicle lane or the roll angle of the vehicle does not exist. After calculating the compensation angle data in step S505, according to the roll angle of the vehicle and bank angle of the vehicle lane, an adjustment for the compensation angle data is found when the vehicle is driving in the certain speed by looking at the lookup table. Therefore, the compensation angle data is adjusted and the vehicle is kept driving between the two lane lines.

By considering the roll angle of the vehicle and the bank angle of the vehicle lane, the automatic lane following control system and method in the present invention may precisely control the vehicle to turn left or right when the vehicle is shifting.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An automatic lane following control system for a vehicle, comprising:
   an image sensor sensing a vehicle lane to generate a lane data;
   a steering angle sensor sensing a steering angle of a wheel of the vehicle to generate a steering angle data;
   an inertial measurement unit (IMU) sensing an acceleration, a yaw rate and a roll angle of the vehicle to generate an acceleration data, a yaw rate data and a roll angle data;
   a vehicle speed sensor sensing a speed of the vehicle to generate a vehicle speed data;
   an electronic device receiving a digital map data;
   a controller respectively connected to the image sensor, the steering angle sensor, the IMU, the vehicle speed sensor and the electronic device, receiving the digital map data, the lane data, the steering angle data, the acceleration data, the yaw rate data, the roll angle data and the vehicle speed data to calculate an compensation angle data of the wheel, and including:
      a centerline compute unit electrically connected to the image sensor and receiving the lane data to calculate a centerline of the vehicle lane to output a centerline data;
      a predicted trajectory compute unit connected to the steering angle sensor and the IMU and receiving the steering data, the acceleration data, the yaw rate data and the digital map data to calculate a predicted shifting trajectory data;
      a lateral displacement area compute unit electrically connected to the centerline compute unit and the predicted trajectory compute unit and receiving the predicted shifting trajectory data and the centerline data to calculate a first area and a second area;
      a steering angle compute unit electrically connected to the IMU and the lateral displacement area compute unit and receiving the first area and the second area to calculate the compensation angle data in accordance with a bank angle data of the vehicle lane and the roll angle data of the vehicle.

2. The automatic lane following control system as claimed in claim 1, wherein a difference between the first area and the second area is an offset area and the steering angle compute unit calculates the compensation angle data of the wheel in accordance with the offset area.

3. The automatic lane following control system as claimed in claim 1, further comprising a Global Data System (GPS), and the digital map data is received by the GPS and the controller acquires the bank angle of the vehicle lane in accordance with the digital map data.

4. The automatic lane following control system as claimed in claim 1, wherein functions for the first area and the second area are:

$$A = \int_{d2}^{d4} \text{func2}(s) - \text{func1}(s) ds;$$

$$B = \int_{d1}^{d2} \text{func2}(s) - \text{func1}(s) ds;$$

where d1 is a first point and the first point is an intersection point between a horizontal extension line of a front head of the vehicle and the centerline, d2 is a second point and the second point is the intersectional point between a trajectory of the predicted shifting trajectory data and the centerline, d3 is a third point and the third point is a look ahead point, d4 is a fourth point and the fourth point is the intersection point between the horizontal extension point of the third point and the centerline, A is the first area, B is the second area, func2(s) is the centerline data, and func1(s) is the predicted shifting trajectory data.

5. An automatic lane following control method, comprising steps of:
   generating a lane data in accordance with a vehicle lane sensed by an image sensor and outputting the lane data to a centerline compute unit;
   calculating and outputting a centerline data in accordance with the lane data by the centerline compute unit;
   calculating a predicted shifting trajectory data of the vehicle in accordance with a yaw rate data, an acceleration data, a vehicle speed data of the vehicle and a steering angle of a wheel of the vehicle;
   calculating a plurality of lateral displacement areas of the vehicle in accordance with the predicted shifting trajectory data and the centerline data;
   calculating an offset area in accordance with the lateral displacement areas so as to calculate an compensation angle data of the wheel of the vehicle;
   adjusting the compensation angle data of the wheel of the vehicle in accordance with a bank angle of the vehicle lane, a roll angle of the vehicle and a reference table.

6. The automatic lane following control method as claimed in claim 5, wherein the step of calculating the predicted shifting trajectory data of the vehicle further includes a step of sensing the yaw rate data, the acceleration data and the roll angle data of the vehicle by an inertial measurement unit (IMU).

7. The automatic lane following control method as claimed in claim 5, wherein the step of calculating the compensation angle data of the wheel of the vehicle is to calculate a first area and a second area between the predicted shifting trajectory data and the centerline data, and the offset area is a difference between the first area and the second area, and functions for the first area and the second area are:

$$A = \int_{d2}^{d4} \text{func2}(s) - \text{func1}(s) ds;$$

$$B = \int_{d1}^{d2} \text{func2}(s) - \text{func1}(s) ds;$$

where d1 is a first point, d2 is a second point, d3 is a third point, d4 is a fourth point, A is the first area, B is the second area, func2(s) is the centerline data, and func1(s) is the predicted shifting trajectory data.

8. The automatic lane following control method as claimed in claim 5, wherein the bank angle data of the lane is acquired by an electronic device from a digital map data.

9. The automatic lane following control method as claimed in claim 5, wherein the reference table is acquired in accordance with the bank angle of the vehicle lane, the roll angle and the speed of the vehicle via a linear regression method.

* * * * *